United States Patent [19]

McCawley et al.

[11] 4,199,453

[45] Apr. 22, 1980

[54] APPARATUS FOR PROTECTING AQUATIC LIFE PASSING THROUGH A WATER FILTER

[75] Inventors: Robert McCawley; Kenneth R. Siddle, both of Birmingham, Ala.

[73] Assignee: Passavant Corporation, Birmingham, Ala.

[21] Appl. No.: 942,959

[22] Filed: Sep. 18, 1978

[51] Int. Cl.² ...................... B01D 33/02; B01D 33/38
[52] U.S. Cl. .................................. 210/160; 210/410; 405/82
[58] Field of Search ............... 210/400, 401, 153, 154, 210/157, 158, 159, 160, 161; 405/81, 82

[56] References Cited

U.S. PATENT DOCUMENTS

| | | | |
|---|---|---|---|
| 1,208,655 | 12/1916 | Reynolds | 210/160 |
| 1,579,105 | 3/1926 | Green | 405/82 |
| 1,874,736 | 8/1932 | Bleyer | 210/160 |
| 1,903,627 | 4/1933 | Koch | 405/82 |
| 2,804,209 | 8/1957 | Carlten et al. | 210/60 |
| 3,093,578 | 6/1963 | Hitmeiser | 210/160 |
| 3,458,046 | 7/1969 | Passaquant | 210/160 |
| 4,040,952 | 8/1977 | Japp | 210/400 |

*Primary Examiner*—Theodore A. Granger
*Attorney, Agent, or Firm*—Woodford R. Thompson, Jr.

[57] ABSTRACT

Apparatus for protecting aquatic life carried by water passing through a vertical traveling band screen unit having inwardly opening screening baskets. Each basket carries a longitudinally extending, inwardly projecting baffle adjacent its trailing side with the portion thereof adjacent the basket being imperforate. The area along the length of each basket at the inner side of the baffle is imperforate and defines with the baffle a pocket for receiving water and aquatic life carried thereby upon upward movement through the water and is adapted to discharge the water and aquatic life carried thereby upon movement of the pocket to a predetermined elevation. A low pressure stream of water transfers the aquatic life from the pocket to a discharge trough located inwardly of the screening unit.

9 Claims, 5 Drawing Figures

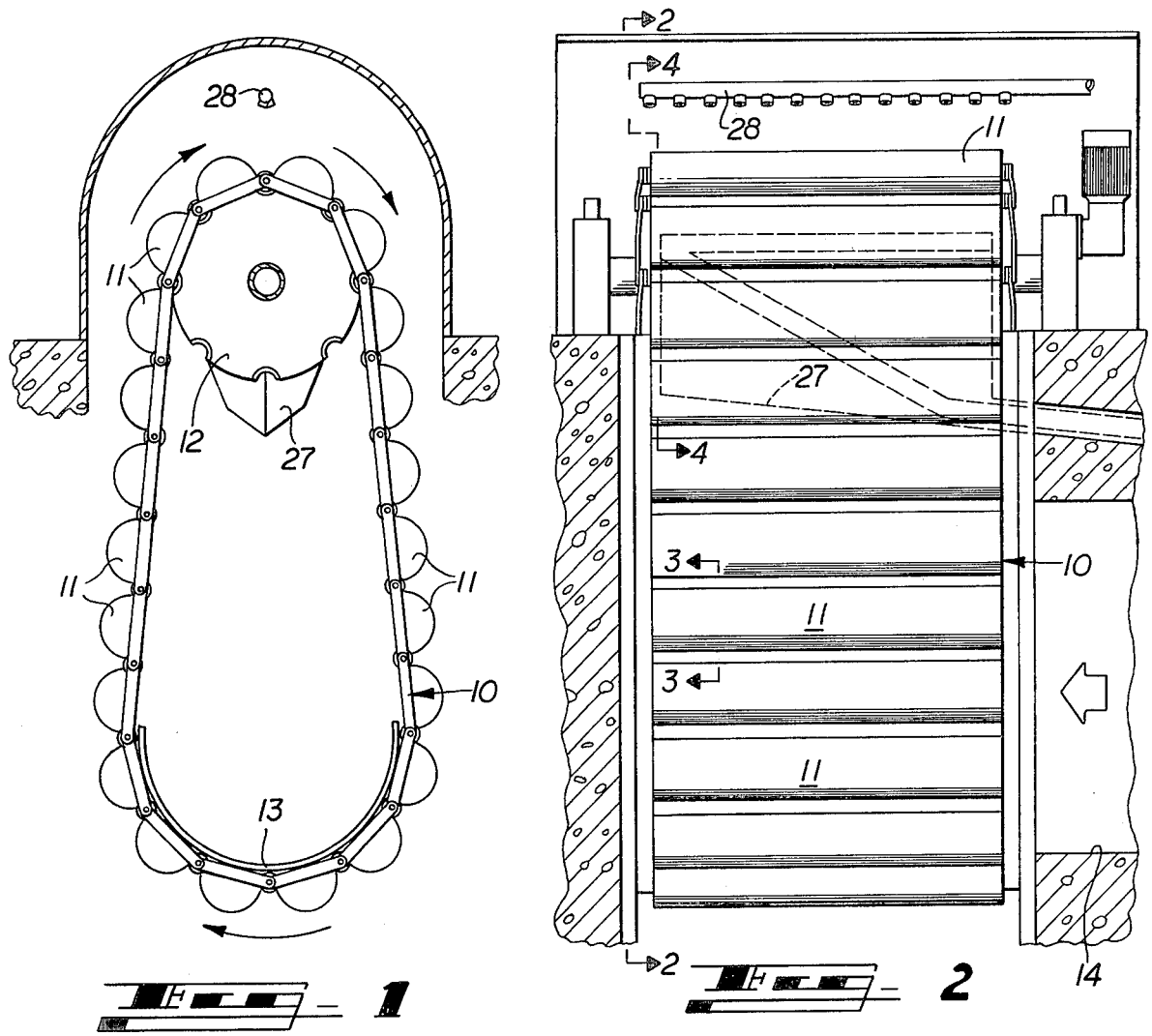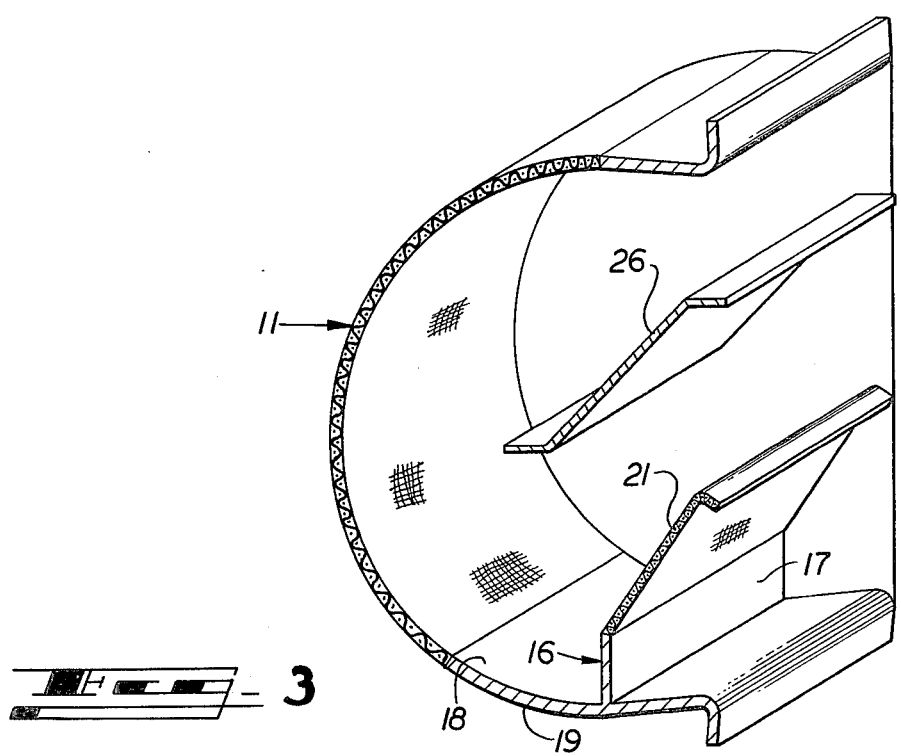

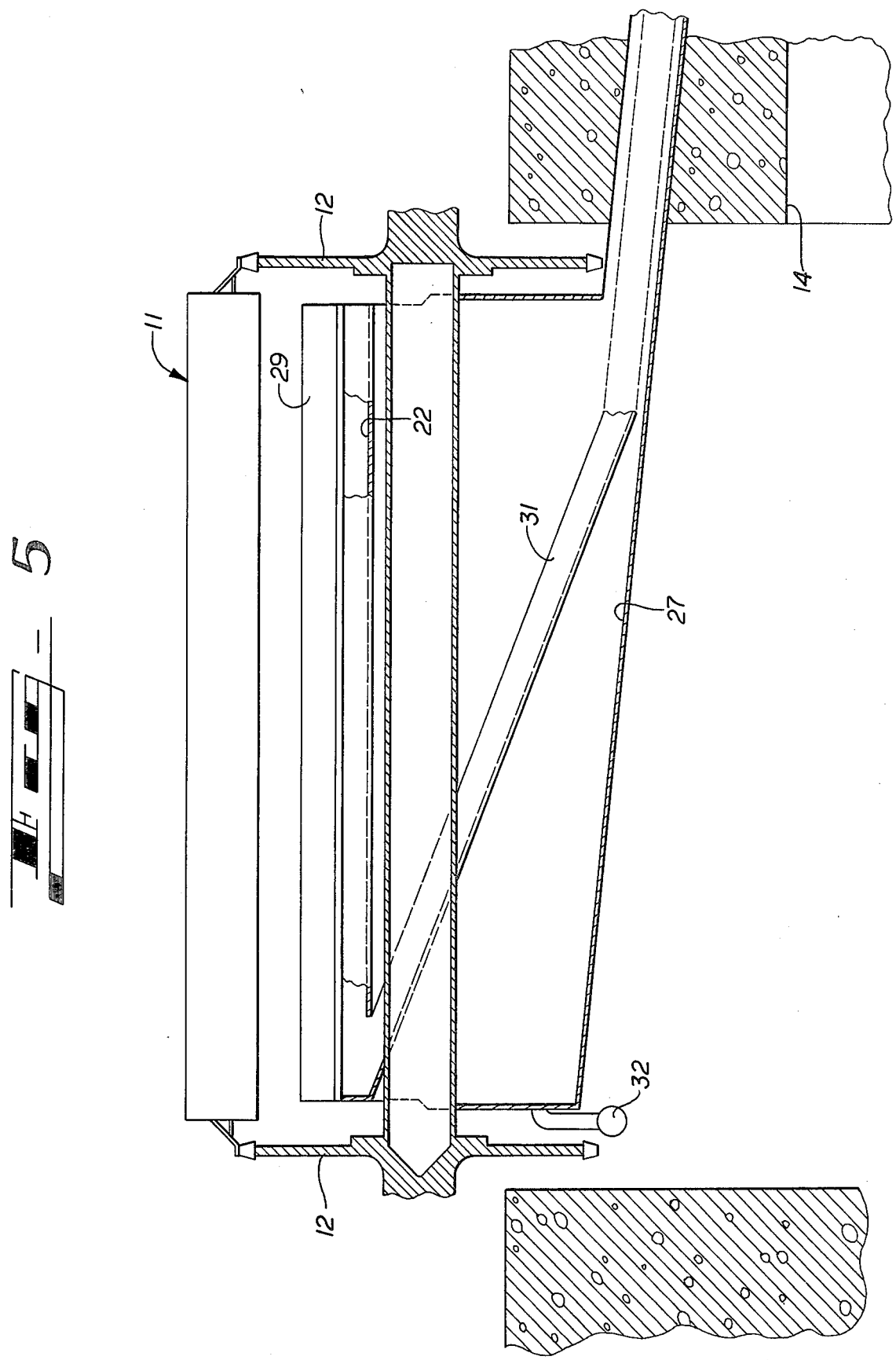

APPARATUS FOR PROTECTING AQUATIC LIFE PASSING THROUGH A WATER FILTER

BACKGROUND OF THE INVENTION

This invention relates to apparatus for protecting aquatic life passing through a water filter and more particularly to means for protecting aquatic life carried by water passing through a screening unit embodying an endless, vertical traveling band screen formed of a plurality of screening baskets which open inwardly and pass around upper and lower terminal members with the water flowing through each screening basket from the inner side toward the outer side thereof.

As is well known in the art to which our invention relates, difficulties have been encountered in protecting aquatic life passing through filter systems, such as the cooling-water intake structure of a power plant. As pointed out in the January, 1977 issue of "POWER" many devices have been proposed for protecting aquatic life at power plant intakes. There are disadvantages in prior art methods of protecting aquatic life due to the fact that the aquatic life is not handled in a gentle manner whereby the aquatic life is tranferred, without injury, from the filter system back to the source water. Potential damage to the aquatic life may be caused by either impingement or entrainment. Impingement occurs when aquatic organisms are trapped against an intake screen by the force of the intake velocity across the screen. The effects of impingement most common on young fish include starvation and exhaustion, asphyxiation, and descaling due to screen spray water. Impingement also applies to entrapped organisms which are drawn into the vicinity of the intake or discharge structure.

Entrainment relates to the transport of organisms small enough to pass through the screen mesh, which subsequently are exposed to abrasion within pumps and condenser tubing, pressure changes through the system, thermal shock in the condenser or discharge tunnel, and exposure to chemical antifoulants. Fish eggs and larvae are the organisms most commonly entrained due to the fact that they have little motile ability and usually cannot escape or avoid the intake flow.

While fish bucket systems have been proposed, such as disclosed on pages 74 and 76 of the January, 1977 "POWER" publication, such fish buckets open outwardly and are rotated almost 180° before the fish are discharged and at the same time the fish fall a substantial distance within the bucket just prior to striking a flexible deflector which directs the fish into a sluice trough.

Our improved apparatus for protecting aquatic life may be employed with traveling band screens of the general type shown in the Jopp U.S. Pat. No. 4,040,952 having inwardly opening screening baskets which are generally semi-cylindrical, as viewed in cross section. Also, the screening baskets may assume other shapes, such as that shown in the Passavant U.S. Pat. No. 3,458,046.

SUMMARY OF THE INVENTION

In accordance with our invention, we protect aquatic life carried by water through a traveling band screen unit having inwardly opening screening baskets by providing a longitudinally extending pocket adjacent the trailing edge of each screening basket. The pocket is defined by an inwardly projecting baffle adjacent the trailing side of the basket and an imperforate area along the length of the basket at the inner side of the baffle. The portion of the inwardly projecting baffle adjacent the basket is imperforate while the outermost portion of the inwardly projecting baffle is preferably pervious whereby water flows therethrough to reduce turbulence. A pocket thus extends longitudinally of each basket in position to receive water and aquatic life carried thereby upon upward movement of the pocket through the water and is adapted to discharge the water and aquatic life carried thereby upon movement of the pocket to a predetermined elevation with the basket passing around the upper portion of the traveling band screen unit. A discharge trough is mounted inwardly of the traveling band screen in position to receive the water and aquatic life discharged from each pocket as it reaches the predetermined elevation adjacent the trough.

DESCRIPTION OF THE DRAWINGS

Apparatus embodying features of our invention is illustrated in the accompanying drawings, forming a part of this application, in which:

FIG. 1 is a side elevational view with parts shown in section, showing a conventional type endless, vertical traveling band screen with our improved apparatus associated therewith;

FIG. 2 is a view taken generally along the line 2—2 of FIG. 1;

FIG. 3 is an enlarged, fragmental view, partly in section, showing one end portion of a screening basket formed in accordance with our invention;

DETAILED DESCRIPTION

Figure 4:
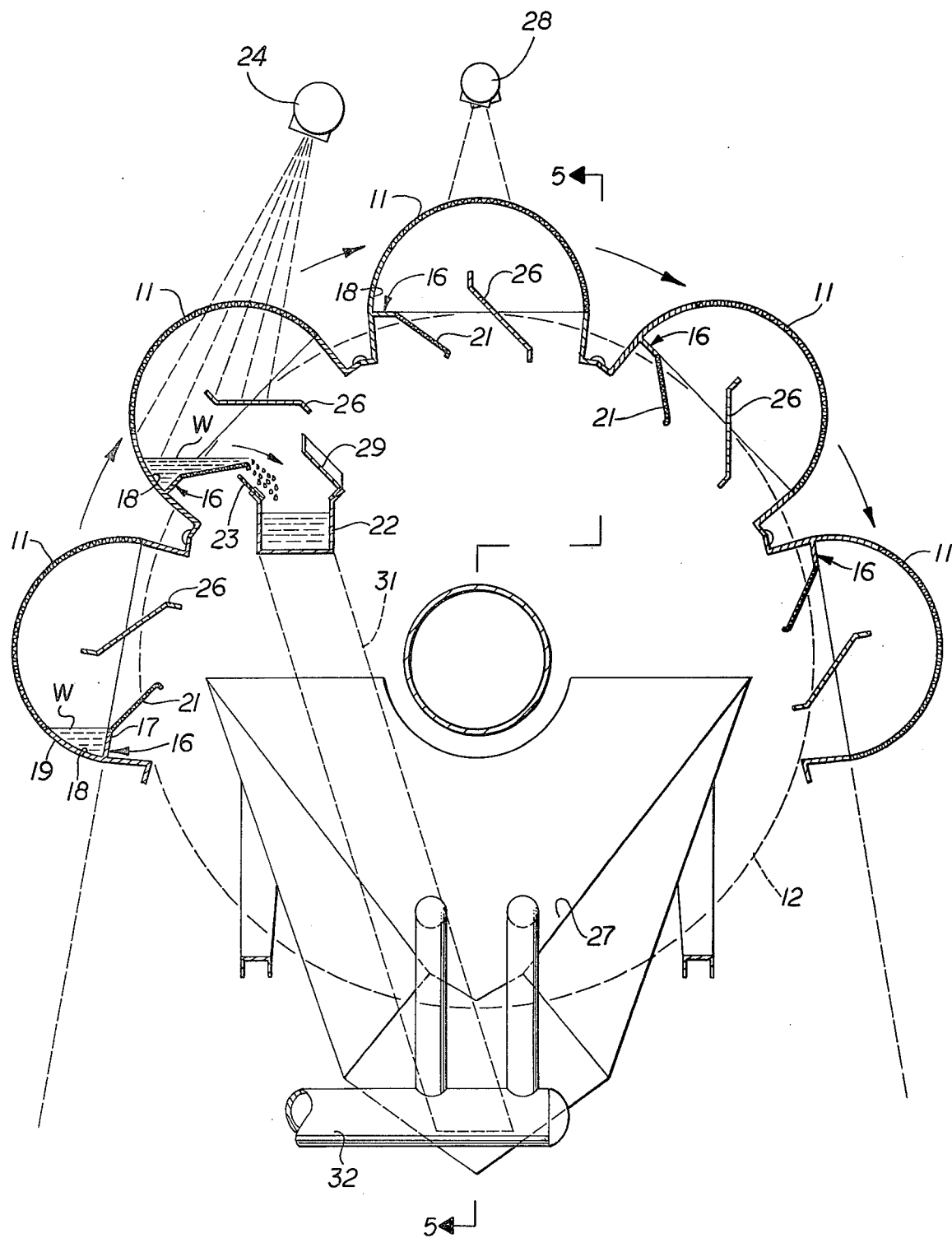
FIG. 4 is an enlarged, sectional view taken generally along the line 4—4 of FIG. 1; and, FIG. 5 is a sectional view taken generally along the line 5—5 of FIG. 4 and drawn to a smaller scale.

Referring now to the drawings for a better understanding of our invention, we show a traveling band screen unit 10 formed of a plurality of screening baskets 11 which may be of a semicylindrical shape. As shown in FIGS. 2, 3 and 4, each of the baskets 11 opens inwardly and pass around upper and lower terminal members 12 and 13, respectively. Preferably, the upper terminal member 12 is in the form of a rotary member which is driven by suitable means while the lower terminal member 13 may be in the form of an arcuate-shaped guide assembly or may be in the form of a rotary member. As shown in FIG. 1, the water flows inwardly of the traveling band screen unit 10 through a suitable inlet 14 whereupon the water then flows through each screening basket 11 from the inner side toward the outer side thereof whereupon the filtered water is then discharged in the usual manner. In view of the fact that endless vertical traveling band screens are well known in the art to which our invention relates, no further description of the flow of the water through the screen unit is deemed necessary.

As shown in FIGS. 3 and 4, an inwardly projecting baffle element 16 is carried by and extends the length of each screening basket 11 adjacent the trailing side thereof, as viewed in the direction of travel. The portion of the baffle element 16 adjacent the basket 11 is imperforate to define one side 17 of a pocket 18 which extends the length of the screening basket 11. The other side 19 of the pocket 18 is defined by an imperforate area along the length of the screening basket 11 at the inner side of the baffle 16, as clearly shown in FIGS. 3 and 4. Accordingly, an elongated pocket 18 is provided in position to receive water and aquatic life carried thereby upon upward movement of the screening basket 11 through the water, as shown in FIG. 4. As clearly shown in FIGS. 3 and 4, the inner portion 21 of each inwardly projecting baffle element 16, which is in spaced relation to the screening basket 11, is pervious so that water passes therethrough to reduce turbulence in the pocket 18. Preferably, the pervious portion 21 of the inwardly projecting baffle element 16 is of a screen material which is the same as the screen material of basket 11.

As shown in FIG. 4, a discharge trough 22 is mounted inwardly of the traveling band screen unit 10 in position to receive the water W and the aquatic life carried thereby which is discharged from each pocket 18 upon upward movement of the pocket 18 to a predetermined elevation adjacent the trough 22, as shown in FIG. 4, with its associated screening basket 11 passing around the upper terminal member 12. The upper longitudinal edge of the trough 22 adjacent the upgoing side of the screening unit 10 carries an upwardly and outwardly projecting flexible element 23 which is adapted to extend beneath the adjacent portion of the baffle element 16 at the time the water W and the aquatic life carried thereby is discharged into the trough 22. It will be noted that the baffle elements 16 of the pocket 18 nearest the trough 22 in FIG. 4 is at a position for the water W and the aquatic life carried thereby to begin discharging into the trough 22. That is, as the pocket 18 nearest the trough 22 continues its upward movement around the upper terminal 12, it moves to a position whereby all of the water W and its aquatic life is flushed into the trough 22 prior to moving beyond the trough 22.

To flush the water W and the aquatic life carried thereby from the pocket 18 into the trough 22, a high volume, low pressure spray of water is introduced through the screening basket 11 adjacent the trough 22 by means of a spray nozzle 24, as shown in FIG. 4. The spray of water thus emitted from the spray nozzle 24 flushes all of the water W and the aquatic life carried thereby originally in the pocket 18 into the trough 22 whereby no aquatic life remains in the pocket 18 as the pocket 18 moves beyond the trough 22. Since the spray of water from the spray nozzle 24 is in the form of a high volume, low pressure stream, there is a gentle transfer of the aquatic life from the pocket 18 to the discharge trough 22.

Heavy trash accumulations are prevented from mixing with the aquatic life in the discharge trough 22 by means of an auxiliary trash deflector 26 mounted in each screening basket 11 in position to catch solids that have been washed off the screening media of each screen basket 11. The solids thus caught are conveyed inwardly of the trash deflector 26 past the discharge trough 22, as shown in FIG. 4, where they are deposited into the primary discharge trough indicated generally at 27, from which the solids can then be conveyed to a suitable location for disposal. The high volume, low pressure shower of water from the spray nozzle 24 thus aids in the trash removal, which may be employed in conjunction with a suitable make-up water line, if necessary.

The screen media of each screening basket 11 is washed or cleaned by introducing a low volume, high pressure spray of water therethrough from a spray nozzle 28 after the aquatic life has been flushed from the pocket 18 into the trough 22. As shown in FIG. 4, the spray nozzle 28 is preferably located adjacent the top of the screening unit whereby the cleaning water emitted from the spray nozzle passes through the screening media of each screening element 11 as it approaches the uppermost position whereupon the water then flows downwardly into the primary discharge trough 27.

To prevent trash and other solid materials from passing into the discharge trough 22, a trash deflector 29 may be carried by the edge of the discharge trough 22 furtherest removed from the inwardly projecting baffle element 16 adjacent thereto. As shown in FIG. 4, the baffle 29 extends upwardly and inwardly above the trough 22 with its uppermost free end extending beneath the adjacent side of the trash deflector 26 with the deflector being in the position shown. The discharge trough 22 is of a depth and the bottom thereof is of a slope to maintain approximately a three inch water depth adjacent the discharge end of the trough. As shown in FIG. 5, the discharge end of trough 22 communicates with the upper end of a discharge conduit 31 whereby the water carrying the aquatic life may be conveyed to a suitable location, such as a return to the source water. Where the water being discharged from the primary trough 27 is of a cleanliness to handle aquatic life, the discharge conduit 31 may discharge directly into the primary discharge trough 27. When the discharge conduit 31 discharges directly into the primary trough 27, the discharge of the primary trough is restricted to maintain a suitable water level therein for handling the aquatic life. Make-up water is introduced into the primary trough by a suitable supply conduit 32 whereby sufficient water is introduced into the primary trough for satisfactory operation of the apparatus.

From the foregoing description, the operation of our improved apparatus for protecting aquatic life passing through a water filter will be readily understood. As the screening baskets 11 of the endless, vertical traveling band screen move upwardly through the water being filtered, the water containing aquatic life is collected in the pockets 18 to provide life support for the aquatic life until such life reaches an elevation adjacent the discharge trough 22. As the pocket 18 reaches this elevation and its screening basket 11 passes around the upper terminal 12, the inwardly projecting baffle 16 is moved toward a generally horizontal position whereby the water carrying the aquatic life is adapted to discharge into the trough 22. As the pocket 18 reaches the elevation adjacent the trough 22, the low pressure flow of water from the nozzle 24 passes through the screening basket 11 and then into the pocket 18 to gently remove the water carrying the aquatic life from the pocket 18 and thus transfer the aquatic life to the discharge trough 22. The high volume, low pressure stream of water thus flushes the water W carrying the aquatic life from the pocket 18 into the trough 22 prior to movement of the inwardly projecting baffle element 16 beyond the trough 22. As the water carrying the aquatic life reaches the discharge end of the trough 22, it enters the discharge conduit 31 whereupon the water carrying the aquatic life may be returned to the source water by suitable means, not shown, or may be discharged into the primary discharge trough 27 and then conveyed to a suitable location, such as the water source.

Heavy trash accumulations are prevented from mixing with the aquatic life in the discharge trough 22 by means of the trash deflector 29 and the trash deflector 26 carried by each screening basket in position to catch solids and the like which have been washed off the screening media. Such solids are then conveyed past the discharge trough 22 whereupon they are then discharged into the primary discharge trough 27, from which they can be conveyed to a suitable disposal location.

From the foregoing, it will be seen that we have devised improved apparatus for protecting aquatic life passing through a water filter. By providing the pickets 18 inwardly of the inwardly opening screening basket which receive the water carrying the aquatic life, the aquatic life is protected until such life is transferred gently into the discharge trough 22 by movement of the pocket 18 to its discharge position in combination with the flow of low pressure water into the pocket to remove therefrom all water carrying aquatic life. Also, by providing trash deflectors 26 and 29, any trash and other solids removed from the screening media of the screening baskets 11 does not enter the discharge trough 22 but is conveyed directly to the primary discharge trough 27. Furthermore, by providing the perforated area 21 in the inwardly projecting baffle element 16, the water is free to flow therethrough whereby turbulence is prevented and at the same time any aquatic life in the water moves downwardly into the pocket 18. Accordingly, the water carrying aquatic life is handled in a gentle manner, without turbulence, from the time it enters the pocket 18 until it is discharged into the discharge trough 22. After entering the discharge trough 22, the water containing aquatic life is maintained in a clean condition as it moves through the trough 22 to the discharge conduit 31 and finally to the source water or other suitable location.

While we have shown our invention in but one form, it will be obvious to those skilled in the art that it is not so limited, but is susceptible of various changes and modifications without departing from the spirit thereof.

What we claim is:

1. In apparatus for protecting aquatic life carried by water through a screening unit embodying an endless vertical traveling band screen formed of a plurality of screening baskets which open inwardly and generally horizontally during their upward travel and pass around upper and lower terminal members with the water flowing through each screening basket from the inner side toward the outer side thereof, (a) a baffle element carried by and extending the length of each screening basket adjacent the trailing side thereof as viewed in the direction of travel and extending inwardly within said basket with at least a portion thereof adjacent said basket being imperforate, (b) an imperforate area along the length of each said basket at the inner side of said baffle element defining with said imperforate portion of each said baffle element an elongated pocket in position to receive water and aquatic life carried thereby upon said upward travel of said basket through said water and adapted to discharge said water and aquatic life carried thereby during said upward travel of said pocket to a predetermined elevation with said basket passing around said upper terminal member, (c) a discharge trough inwardly of said traveling band screen having an edge thereof adapted to extend adjacent and beneath said baffle element with said baffle element terminating at a location over and beyond the adjacent edge of said discharge trough in position to receive the water and aquatic life discharged from each said pocket during upward travel of said pocket at said predetermined elevation, and (d) means for introducing a low pressure flow of water into each said pocket upon movement thereof to said predetermined elevation to gently remove from said pocket the water carrying aquatic life and thus transfer said aquatic life from said pocket to said discharge trough.

2. Apparatus for protecting aquatic life as defined in claim 1 in which each said screening basket is generally semicylindrical as viewed in transverse cross section.

3. Apparatus for protecting aquatic life as defined in claim 1 in which a portion of said inwardly projecting baffle element in spaced relation to said basket is pervious so that water passes therethrough to reduce turbulence in said pocket.

4. Apparatus for protecting aquatic life as defined in claim 3 in which the pervious portion of said inwardly projecting baffle element is of a screen material the same as that of said screening baskets.

5. Apparatus for protecting aquatic life as defined in claim 1 in which said discharge trough is of a depth and the bottom thereof is of a slope to maintain approximately a three inch water depth adjacent the discharge end of said trough.

6. Apparatus for protecting aquatic life as defined in claim 1 in which said means for introducing a low pressure flow of water into each said pocket comprises a high volume low pressure spray nozzle mounted outwardly of said screening basket in position to direct said flow of water through said screening basket into said pocket.

7. Apparatus for protecting aquatic life as defined in claim 1 in which means is provided for introducing a high pressure spray of water through each said basket after said aquatic life has been discharged from said pocket into said trough.

8. Apparatus for protecting aquatic life as defined in claim 7 in which a trash deflector is carried by the edge of said trough furtherest removed from said inwardly projecting baffle element while said pocket is at said predetermined elevation with said trash deflector extending in an upward and inward direction relative to said trough in position to deflect away from said trough the trash removed from said basket by said high pressure spray of water.

9. Apparatus for protecting aquatic life as defined in claim 8 in which a trash deflector is carried by and extends longitudinally of each said screening basket forwardly of said inwardly projecting baffle element as viewed in the direction of travel in position to extend above said trash deflector carried by said trough upon movement of said pocket to said predetermined elevation.

* * * * *